Patented Jan. 19, 1932

1,841,621

UNITED STATES PATENT OFFICE

MORDECAI MENDOZA, OF BLACKLEY, MANCHESTER, ENGLAND, ASSIGNOR TO BRITISH DYESTUFFS CORPORATION LIMITED, OF MANCHESTER, ENGLAND

MANUFACTURE OF PYRAZOLONE COMPOUNDS

No Drawing. Application filed April 2, 1927, Serial No. 180,618, and in Great Britain May 12, 1926.

In an application of Saunders and Mendoza, Serial No. 97,758, filed March 26, 1926, the use of various amino derivatives of 3-carboxy-4-hydroxy-diphenyl sulphide is described as first components in the preparation of azo dyestuffs.

I have found that such amino sulphides may be converted into new and modified intermediates which are also useful in the production of azo dyestuffs. These new modified intermediates are diphenyl sulphides, with one benzene residue carrying a chelate group useful in mordant dyeing and the other benzene residue having a pyrazolone residue attached thereto. These bodies are valuable as second or end components in the preparation of new azo dyestuffs.

They may be made from compounds having the formula

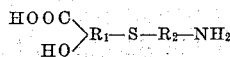

wherein $R_1$ and $R_2$ represent benzene residues which may be further substituted and in which the OH and COOH groups are ortho to each other. Such amino sulphide compounds are diazotized to form the diazo compound and then the diazo compound is reduced to give the hydrazine compound. The hydrazine compound is condensed with a beta-ketonic ester to convert the hydrazine group into a pyrazolone ring. As suitable beta-ketonic esters I may mention aceto-acetic-ester and oxal-acetic ester, but I do not limit myself to these compounds only. The aceto-acetic-ester forms a methyl substituted and the oxal-acetic ester forms a carboxyl substituted pyrazolone. The general class of beta-ketonic esters is applicable to my process.

These new intermediates produced in the manner indicated above have the probable formula

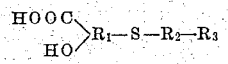

wherein $R_1$ and $R_2$ represent benzene residues and $R_3$ represents a pyrazolone ring and in which the COOH and OH groups are ortho to each other. I find that such new intermediates which have the hydroxy group para to the sulphur atom are particularly advantageous, as for instance the new intermediates prepared from 3-carboxy-4-hydroxy-diphenyl sulphide or the homologues or substitution products of the same.

My new intermediates may be converted into azo dyestuffs by coupling them with diazo compounds, including in this term diazotized monoamino compounds, diazotized aminoazo compounds and tetrazotized diamino compounds. These new dyestuffs show excellent fastness to washing and are suitable both as acid colors for animal fibres and as chrome printing colors for cotton. They have the special advantage of showing practically no change in shade on chroming; this effect being due to the separation of the chelate grouping from the chromophoric portion of the molecule by the sulphide bridge linkage. The shades of the dyes vary from greenish-yellow to reddish-orange according to the first component used in the preparation.

Azo dyes made from my new intermediates may be represented by the general formula

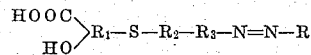

wherein $R_1$ and $R_2$ represent benzene residues, $R_3$ represents a pyrazolone ring and R represents a coupled residue from a diazotized coupling component of the benzene or naphthalene series, such as a diazotized sulphanilic acid, which may be chlorine substituted, and in which the OH and COOH groups are ortho to each other.

One of the generic formulæ which can be used to represent both the intermediates and the dyes of my invention is:

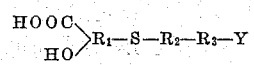

wherein $R_1$ and $R_2$ represent benzene residues both of which may be further substituted and in which the COOH and OH groups are ortho to each other; $R_3$ represents a pyrazolone ring and Y represents hydrogen or a substituent group such as —N:N—R or —N : N—R₉—N : N—R₆ wherein R represents a coupled residue from a diazotized coupling component of the benzene or naphthalene series, R₆ represents the coupled residue of an azo dye component of the benzene or naphthalene series and R₉ represents a divalent residue of an azo dye component of the benzene or naphthalene series. By the term "coupled residue of an azo dye component" I mean the coupled residue from an azo dye coupling component or from a diazotized coupling component. Processes producing compounds wherein Y represents —N : N—R₉—N : N—R₆ are given in Example 1, below.

Other generic formulæ are:

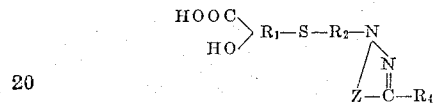

and

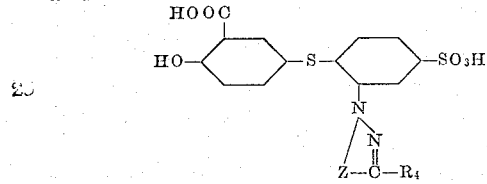

wherein R₁ and R₂ have their former significance, R₄ represents CH₃ or COOH and Z represents the structure

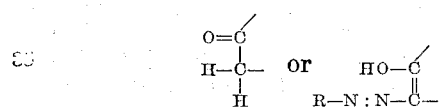

wherein R represents a coupled residue from a diazotized coupling component of the benzene or naphthalene series, such as a diazotized sulphanilic acid which may be chlorine substituted.

*Example 1*

173 parts by weight of sulphanilic acid are diazotized in the usual manner and combined in the presence of sodium carbonate with 422 parts of the pyrazolone of the following probable structure

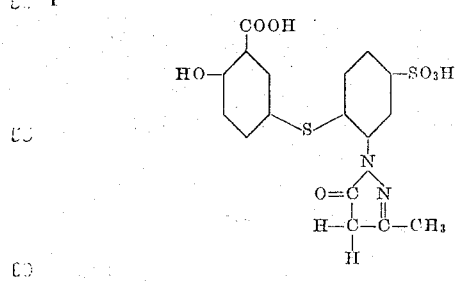

This compound may be obtained by first reducing to the corresponding hydrazine by any of the usual methods, the sparingly soluble diazo compound resulting from the interaction of 2'-amino-4-hydroxy-3-carboxy-4'-sulphodiphenyl sulphide with the equivalent amount of nitrous acid and then condensing the faintly alkaline (soda) solution of the hydrazine with the equivalent amount of ethyl acetoacetate.

Coupling of the diazotized sulphanilic acid with the pyrazolone so produced is very rapid and, when complete, the dyestuff is isolated by salting out after giving the solution a slight mineral acidity.

When dried and ground the dyestuff is a yellow powder, easily soluble in water to a yellow solution, the colour of which is discharged by warm stannous chloride in the presence of hydrochloric acid, but is not affected by acids or alkalies of twice normal strength. In concentrated sulphuric acid it dissolves to a brown solution, changing on dilution with water through red-brown to greenish-yellow. In concentrated hydrochloric or nitric acid it gives an orange solution, becoming yellow on dilution. By reducing it with hydrosulphite solution, sulphanilic acid and an aminopyrazolone having the probable structure:

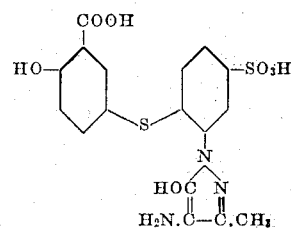

are obtained.

The dye itself in the form of the free acid has the probable structure:

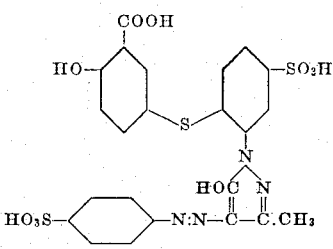

From an acid bath it dyes wool in an even greenish yellow shade which on after-chroming becomes only slightly greener. A similar shade to this latter is obtained when the dye is applied to chrome mordanted wool.

In presence of chrome mordant it prints cotton a brilliant greenish-yellow.

If, in the above example, 242 parts of 2 : 6-dichlorosulphanilic acid are used in place of the 173 parts of sulphanilic acid, the new dyestuff produced, which is isolated in a similar manner, gives slightly redder shades both on wool and on cotton; while the substitution of 223 parts of naphthionic acid for the 173 parts of sulphanilic acid results in the formation of a dyestuff which produces bright yellowish-orange shades on wool and cotton.

The same pyrazolone when coupled in alkaline solution with diazotized amino-azobenzene gives a dyestuff which dyes an orange-yellow on wool, on chrome-mordanted wool, or on wool by after-chroming, and gives orange shades when chrome-printed on cotton. The dyestuff similarly obtained by coupling the pyrazolone with diazotized benzene-azo-1-naphthylamine-6 (or 7)-sulphonic acid, dyes wool a yellowish-red, practically unchanged in shade by chroming, and gives a red-brown when chrome-printed on cotton.

Tetrazotized benzidine, coupled with two molecular proportions of the pyrazolone gives an orange wool dyestuff, the shade being merely deepened by chroming, and when the dyestuff is chrome-printed on cotton, a light brown shade is obtained.

*Example 2*

173 parts by weight of sulphanilic acid are diazotized in the usual manner and combined in the presence of sodium carbonate with 452 parts of the carboxypyrazolone obtained by condensing the hydrazine mentioned in Example 1 with the equivalent amount of oxal acetic ester in presence of sodium acetate. The pyrazolone produced has the same probable structure as that produced in Example 1, with the exception that the methyl group in the 3-position of the pyrazolone is replaced by a carboxyl group.

Coupling takes place very readily and the dyestuff is obtained as a light brown powder on salting out after giving the solution a mineral acidity, filtering and grinding.

The new dyestuff dyes wool from an acid bath a reddish-yellow shade which on after-chroming changes to brownish-yellow, a similar shade being obtained when the dyestuff is applied to chrome-mordanted wool.

If in the above example 242 parts of 2:6-dichloro-sulphanilic acid are used in place of 173 parts of sulphanilic acid, the new dyestuff, upon isolation in a similar manner, is obtained as a light brown powder. The direct and after-chromed shades produced by it on wool are slightly redder than those yielded by the dyestuff in the above example and the shade on chrome-mordanted wool is very similar to that obtained by after-chroming the direct shade. The dyestuff has the probable formula

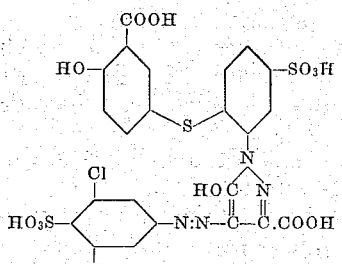

Cotton is printed a reddish-yellow shade in the presence of chrome mordant.

If the equivalent amount of naphthionic acid (223 parts) is substituted for the sulphanilic acid used in Example 1, the resulting dyestuff is obtained as a dark red-brown powder which produces a bright reddish-orange shade when dyed direct on wool from an acid bath. On after-chroming, a light reddish-brown shade is obtained—a similar but rather deeper shade resulting when the dyestuff is applied to chrome-mordanted wool.

Printed on cotton in presence of chrome mordant, it gives a reddish-orange shade.

What I claim and desire to secure by Letters Patent is:—

1. In the manufacture of new dyestuff intermediates and new azo dyes therefrom, the steps which comprise diazotizing an amino diphenyl sulphide of the type

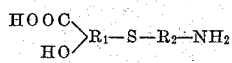

wherein $R_1$ and $R_2$ represent benzene residues and in which the OH and COOH groups are ortho to each other, reducing the diazzo compound so obtained to the hydrazine compound and then condensing the said hydrazine compound with a beta-ketonic ester.

2. In the manufacture of new dyestuff intermediates and new azo dyes therefrom, the steps which comprise diazotizing an amino diphenyl sulphide of the type

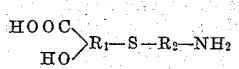

wherein $R_1$ and $R_2$ represent benzene residues and in which the OH and COOH groups are ortho to each other and the hydroxyl group is attached to $R_1$ in the para position to the sulphide bridge, reducing the diazo compound so obtained to the hydrazine compound and then condensing the said hydrazine compound with a beta-ketonic ester.

3. In the manufacture of new dyestuff intermediates and new azo dyes therefrom, the steps which comprise diazotizing an amino diphenyl sulphide of the type

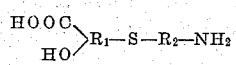

wherein $R_1$ and $R_2$ represent benzene residues and in which the OH and COOH groups are ortho to each other and the hydroxyl group is attached to $R_1$ in the para position to the sulphide bridge, reducing the diazzo compound so obtained to the hydrazine compound and then condensing the said hydrazine compound with an ethyl aceto-acetic ester.

4. In the manufacture of new dyestuff intermediates and new azo dyes therefrom, the steps which comprise diazotizing an amino diphenyl sulphide of the type

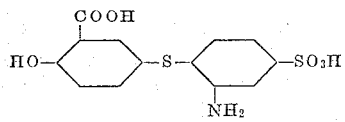

reducing the diazo compound so obtained to the hydrazine compound and then condensing the said hydrazine compound with an ethyl aceto-acetic ester.

5. In the manufacture of chromable azo dyes in which the chelate grouping is separated by a sulphide bridge linking from the rest of the molecule containing chromophore groups, the process which comprises coupling a diazzo compound selected from the benzene and naphthalene series with a pyrazolone compound having the probable structure

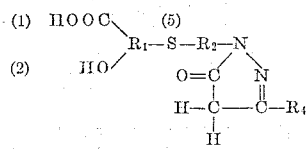

wherein $R_1$ and $R_2$ represent benzene residues and $R_4$ represents methyl or carboxyl.

6. In the manufacture of chromable azo dyes in which the chelate grouping is separated by a sulphide bridge linking from the rest of the molecule containing chromophore groups, the process which comprises coupling a sulphonated diazo compound selected from the benzene and naphthalene series with a pyrazolone compound having the probable structure:

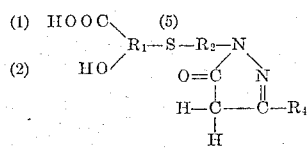

wherein $R_1$ and $R_2$ represent benzene residues and $R_4$ represents methyl or carboxyl.

7. In the manufacture of chromable azo dyes in which the chelate grouping is separated by a sulphide bridge linking from the rest of the molecule containing chromophore groups, the process which comprises coupling a sulphonated diazo compound selected from the benzene and naphthalene series with a pyrazolone compound having the probable structure

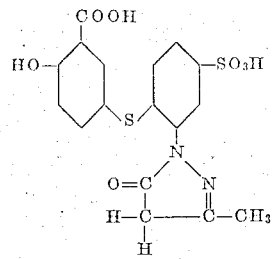

8. In the manufacture of new dyestuff intermediates and new azo dyes therefrom, the process which comprises diazotizing an amino diphenyl sulphide of the type

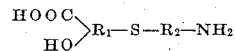

wherein $R_1$ and $R_2$ represent benzene residues and in which the COOH and OH groups are ortho to each other, reducing the diazo compound so obtained to the hydrazine compound, condensing the said hydrazine compound with a beta-ketonic ester to produce a pyrazolone derivative and then coupling the so produced pyrazolone derivative with a diazo compound selected from the benzene and naphthalene series.

9. As new azo dyestuff intermediates and related azo dyestuffs, the compositions of matter having the probable formula

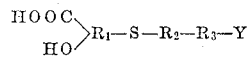

wherein $R_1$ and $R_2$ represents benzene residues in which the COOH and OH groups are ortho to each other, $R_3$ represents a pyrazolone ring and Y represents a substituent selected from a group consisting of hydrogen or $-N:N-R$ or $-N:N-R_9-N:N-R_6$ wherein R represents a coupled residue from a diazotized coupling component of the benzene or naphthalene series, $R_6$ represents a coupled residue of an azo dye component of the benzene or naphthalene series and $R_9$ represents a divalent residue of an azo dye component of the benzene or naphthalene series.

10. The products of claim 9 wherein the OH group is in the para position in respect to the S atom.

11. As azo dyestuff intermediates and related azo dyestuffs, the compositions of matter represented by the probable formula

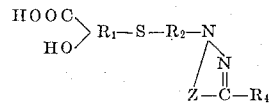

wherein $R_1$ and $R_2$ represents benzene residues in which the COOH and OH groups are ortho to each other, $R_4$ represents $CH_3$ or COOH and Z represents the structure

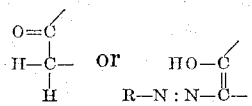

wherein R represents a coupled residue from a diazotized coupling component of the benzene or naphthalene series.

12. The products of claim 11 wherein R represents the coupled residue of a diazotized sulphanilic acid which may be chlorine substituted.

13. The products of claim 11 wherein $R_4$ represents a $CH_3$ group.

14. The products of claim 11 wherein the OH group is para to the S atom.

15. As azo dyestuff intermediates and related azo dyestuffs, the compositions of matter represented by the probable formula

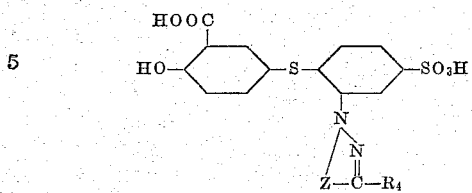

wherein $R_4$ represents $CH_3$ or COOH and Z represents the structure

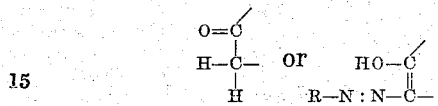

wherein R represents a coupled residue from a diazotized coupling component of the benzene or naphthalene series.

16. The products of claim 15 wherein $R_4$ represents a $CH_3$ group.

17. The products of claim 15 wherein R represents the coupled residue of a diazotized sulphanilic acid which may be chlorine substituted.

18. As new dyestuff intermediates, compounds having the probable formula

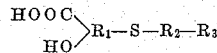

wherein $R_1$ and $R_2$ represent benzene residues, $R_3$ represents a pyrazolone ring and in which the COOH and the OH groups are ortho to each other.

19. As new dyestuff intermediates, compounds having the probable formula

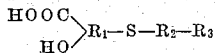

wherein $R_1$ and $R_2$ represent benzene residues, $R_3$ represents a pyrazolone ring and in which the COOH and the OH groups are ortho to each other, the OH group being attached to $R_1$ in the para position to the sulphide bridge.

20. As new dyestuff intermediates, compounds having the probable formula

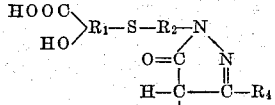

wherein $R_1$ and $R_2$ represent benzene residues, $R_4$ represents a methyl or carboxyl group and in which the COOH and the OH groups are ortho to each other.

21. As a new dyestuff intermediate, an amino sulphide having the probable formula

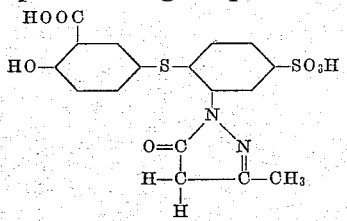

22. Azo dyes carrying a chelate group and adapted for mordant dyeing with the chelate group separated from the chromophore group by a sulphide bridge, the azo dyes being pyrazolone derivatives having the probable formula

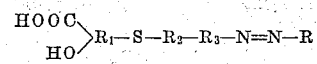

wherein $R_1$ and $R_2$ represent benzene residues, $R_3$ represents a pyrazolone ring and R represents a coupled residue from a diazotized coupling component of the benzene or naphthalene series, and in which the COOH and OH groups are ortho to each other, the said dyestuff producing shades which are substantially unchanged when chromed.

23. Azo dyes carrying a chelate group and adapted for mordant dyeing with the chelate group separated from the chromophore group by a sulphide bridge, the azo dyes being pyrazolone derivatives having the probable formula

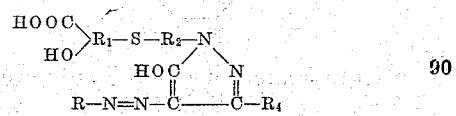

wherein $R_1$ and $R_2$ represent benzene residues, $R_4$ represents a methyl or carboxyl group and R represents a coupled residue from a diazotized coupling component of the benzene or naphthalene series, and in which the COOH and OH groups are ortho to each other, the said dyestuffs producing shades which are substantially unchanged when chromed.

24. As a new dyestuff, a compound obtainable by coupling diazotized sulphanilic acid with a pyrazolone, the said pyrazolone being obtainable by condensing 2'-hydrazino-4-hydroxy-3-carboxy-4'-sulphodiphenyl sulphide with an aceto-acetic ester, said compound in the form of the free acid having as its probable structure

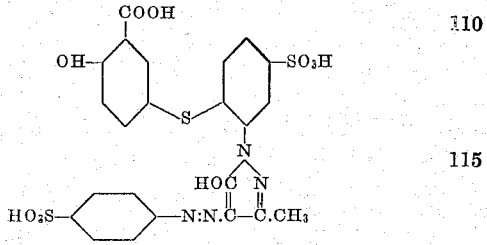

said dyestuff being a yellow powder, easily soluble in water to a yellow solution, the color of which is discharged by warm stannous chloride in the presence of hydrochloric acid, but not being affected by acids or alkalies of twice normal strength; said dyestuff in concentrated sulphuric acid dissolving to a brown solution, changing on dilution with water through red-brown to greenish-yellow, in concentrated hydrochloric or nitric acid giving an orange solution, becoming yellow on dilution and said dyestuff, by reduction with hydrosulphite solution, yielding sulphanilic acid and an aminopyrazolone having the probable structure
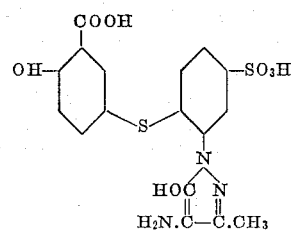
25. A new azo dye having the probable formula
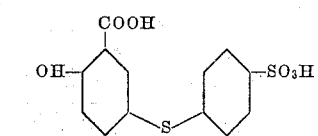
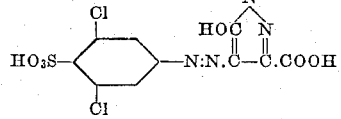
In testimony whereof I affix my signature.
MORDECAI MENDOZA.